United States Patent [19]

Banas et al.

[11] Patent Number: 4,794,231

[45] Date of Patent: Dec. 27, 1988

[54] METHOD OF AND ARRANGEMENT FOR LASER WELDING

[75] Inventors: Conrad M. Banas, Bolton; Brian M. Doyle, East Hartford, both of Conn.

[73] Assignee: United Technologies Corporation, Hartford, Conn.

[21] Appl. No.: 137,682

[22] Filed: Dec. 24, 1987

[51] Int. Cl.$^4$ .............................................. B23K 26/00
[52] U.S. Cl. ........................ 219/121.63; 219/121.74; 219/121.77; 219/121.64
[58] Field of Search ................. 219/121 LC, 121 LD, 219/121 LP, 121 LQ, 121 LS, 121 LT

[56] References Cited

U.S. PATENT DOCUMENTS

| 4,327,275 | 4/1982 | Asaba et al. | 219/121 LT X |
| 4,358,658 | 11/1982 | Van Blarigan et al. | 219/121 LC |
| 4,520,254 | 5/1985 | Steiger et al. | 219/121 LS X |

FOREIGN PATENT DOCUMENTS

| 0193793 | 8/1986 | Japan | 219/121 LD |
| 1201731 | 9/1986 | Japan | 219/121 LS |

Primary Examiner—C. L. Albritton
Attorney, Agent, or Firm—Peter R. Ruzek

[57] ABSTRACT

Laser welding is accomplished in a laser welding arrangement by positioning a plurality of workpieces to be joined next to one another so as to form an assembly having at least one interface between the workpieces, by simultaneously directing two laser beams from opposite sides of the assembly against effective welding regions of the workpieces that adjoin the interface and are substantially aligned with one another across the interface, and by effecting relative movement between the assembly and the two laser beams along the interface while maintaining the substantial alignment of the effective welding regions.

15 Claims, 3 Drawing Sheets

METHOD OF AND ARRANGEMENT FOR LASER WELDING

TECHNICAL FIELD

The present invention relates to laser welding in general, and more particularly to a method of and an arrangement for welding a plurality of workpieces to one another using laser beams.

BACKGROUND ART

It is already known to use a laser beam for welding a plurality of workpieces together. To perform such laser welding, a laser beam is directed at the region of the interface between the workpieces to be connected with one another by a welded joint, and a relative movement is effected along the interface between the laser beam and the assembly of the workpieces. Usually, the intensity of the laser beam is sufficient for the laser beam to penetrate through the entire interface between the workpieces to make the weld extend from one side of the assembly of workpieces to the other.

Experience with this approach has shown that it has several disadvantages. For one, since it is desirable for the welded joint to exhibit a narrow width relative to the thickness of the workpieces being joined in order to minimize energy input, and since the ratio of weld width to thickness, generally speaking, remains approximately constant with increasing thickness of the workpieces at about 5:1 more, the amount of workpiece base material that is being heated to, or above, the melting temperature of such material may be excessive, especially when the thickness of the workpieces is large. Moreover, the quality of the root bead in thick weldments is often quite poor, resulting in a reduced quality of the welded joint as a whole. Furthermore, because of the existence of thermal stresses between the two oppositely facing sides of the workpiece assembly during the performance of the laser welding operation due to the one-sided application of the laser beam to the workpiece assembly, some warping may occur in the workpieces being joined, resulting in diminished quality of the welded workpiece assembly and/or requirements for significant post-weld machining.

It has also been proposed, particularly for situations in which workpieces of substantial thickness are to be welded together, to weld the workpiece assembly from one side first during an initial welding pass, and to subsequently complete the welded joint by welding the partially welded workpiece assembly from its other side during a second welding pass. While this approach results in a substantial reduction or total elimination of the problem of poor root bead quality, it merely transfers the problem area deeper into the welded joint. This is so because the subsequent laser beam does not carry a sufficient amount of energy for penetration through the workpieces to the other side of the assembly, so that this subsequent laser beam forms a blind weld, which characteristically results in aggravated plasma conditions and generation of voids, bubbles or similar welded joint porosity at the root of the second pass penetration. Also, at least the laser beam used during the second welding pass has to carry an amount of energy sufficient for penetration into the root portion of the welded region formed during the initial pass so as to provide an effective fusion zone tie between the separate regions of the welded joint. This not only results in an increased energy consumption relative to the theoretical minimum, but also aggravates the aforementioned plasma formation and venting problems brought about by operation in a blind hole and resulting in welded joint porosity.

Accordingly, it is a general object of the present invention to avoid the disadvantages of the prior art.

More particularly, it is an object of the present invention to provide a laser welding method which does not possess the disadvantages of the known methods of this kind.

Still another object of the present invention is so to develop the method of the type here under consideration as to reduce the energy consumption and improve the quality of the welded joint as compared to those obtained when using the heretofore known laser welding methods.

A concomitant object of the present invention is to devise a laser welding arrangement which is particularly suited for the performance of the above method.

It is yet another object of the present invention to design the laser welding arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a method of laser welding, this method comprising the steps of positioning a plurality of workpieces to be joined next to one another so as to form an assembly having at least one interface between the workpieces; simultaneously directing two laser beams from opposite sides of the assembly against effective welding regions of the workpieces that adjoin the interface and are substantially aligned with one another across the interface; and effecting relative movement between the assembly and the two laser beams along the interface while maintaining the substantial alignment of the effective welding regions.

According to another aspect of the present invention, there is provided an arrangement for performing laser welding which comprises means for holding a plurality of workpieces to be joined next to one another so as to form an assembly having at least one interface between the workpieces; means for simultaneously directing two laser beams from opposite sides of the assembly against effective welding regions of the workpieces that adjoin the interface and are substantially aligned with one another across the interface; and means for effecting relative movement between the assembly and the two laser beams along the interface while maintaining the substantial alignment of the effective welding regions.

BRIEF DESCRIPTION OF THE DRAWING

The present invention will be described in more detail below with reference to the accompanying drawing in which.

BEST MODE FOR CARRYING OUT THE INVENTION

Figure 1:
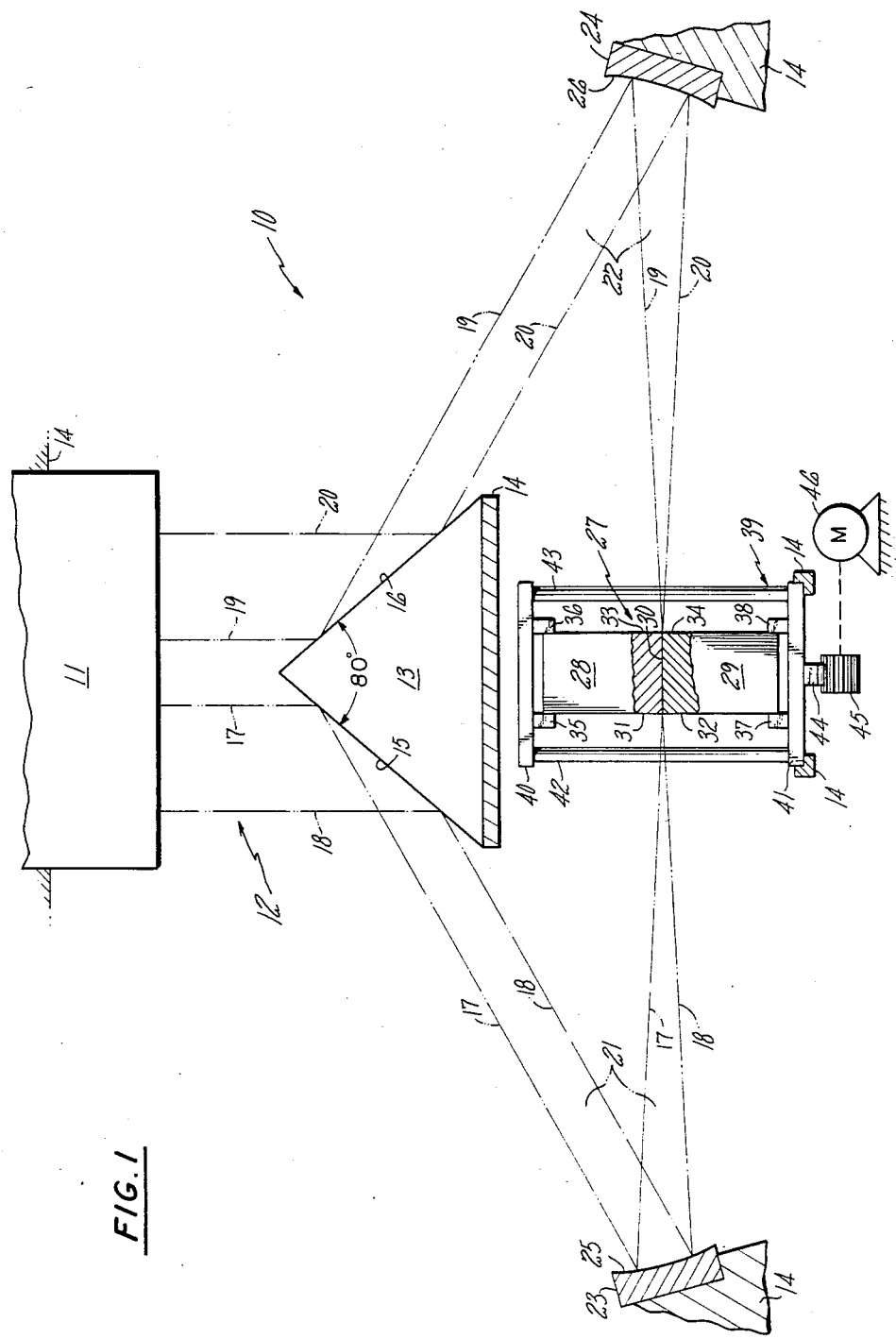
FIG. 1 is an elevational view of an exemplary embodiment of a laser welding arrangement incorporating the present invention and of a workpiece assembly being welded by the laser welding arrangement.

Referring now to the drawing in detail, and first to FIG. 1 thereof, it may be seen that the reference numeral 10 has been used therein to identify a laser welding arrangement embodying the present invention. The laser welding arrangement 10 includes a diagrammatically indicated laser beam source 11 which is of any known construction and may include a laser and laser optics. The laser beam source 11 issues a laser beam 12 which is aimed at a beam splitter 13. The laser beam source 11, the beam splitter 13 and other components of the laser welding arrangement 10 are shown to be stationarily mounted or movably supported on a stationary support 14.

The beam splitter 13 has two reflective surfaces 15 and 16 that are shown to include an angle of 80° between themselves. This angle, however, is not critical and, moreover, other beam splitting techniques could be used instead. Each of these reflective surfaces 15 and 16 reflects a portion of the laser beam 12 in a different direction, as indicated by respective rays 17, 18, 19 and 20 which are representative of the light rays of the laser beam 12 and of laser beam portions 21 and 22 into which the beam splitter 13 splits the original laser beam 12 but do not necessarily constitute the boundary rays either of the original laser beam 12 or of the laser beam portions 21 or 22.

Each of the laser beam portions 21 and 22, after traveling a certain distance in the direction or path into which it has been reflected by the beam splitter 13, reaches a respective mirror element 23 or 24 and is reflected therefrom. Each of the mirror elements 23 and 24 is shown to have a concave reflective surface 25 or 26, respectively, which focuses the part of the respective split beam portion 21 or 22 that is situated downstream of the respective mirror element 23 or 24 toward a respective focal point. However, it will be appreciated that the reflective surfaces 25 and 26 could be, for instance, flat if the laser beam 12 and the split beam portions 21 and 22 were already converging, for instance due to the action of the aforementioned laser optics of the laser beam source 11.

As shown in FIG. 1 of the drawing, the split laser beam portions 21 and 22 are directed by the mirror elements 23 and 24 toward an assembly 27 of workpieces 28 and 29 that are to be welded together and that meet or abut one another at an interface 30, and the focal points of the split laser beam portions 21 and 22 are shown to be situated at the interface 30 and substantially at respective major surfaces 31, 32, 33 and 34 of the workpieces 28 and 29. It will be readily understood that, because of their common origin, the split laser beam portions 21 and 22 are substantially aligned with one another so that they attack regions of the workpiece assembly 27 which are substantially aligned with one another across the interface 30. However, this principle of substantial mutual alignment of the two laser beam portions that approach the workpiece assembly 27 from opposite sides thereof would also be applicable if, as also contemplated by the present invention, each of such laser beam portions originated from a different laser beam source.

FIG. 1 of the drawing also illustrates in a simplified manner that the workpieces 28 and 29 of the workpiece assembly 27 are held in their illustrated positions by respective holding members 35, 36, 37 and 38 which, in turn, are mounted on a carrier that is generally identified by the reference numeral 39. The holding members 35, 36, 37 and 38 are shown to be mounted on respective mounting members 40 and 41 of the carrier 39, for instance for displacement toward and away from one another to act as clamping jaws. It should be understood, however, that the depicted construction of the carrier 39 and of its components is merely exemplary and that any other construction could be used instead.

The mounting member 41 is shown to be mounted on rail-like portions of the stationary support 14 for displacement perpendicularly to the plane of the drawing. Respective tie rods 42 and 43, which are disposed outside the area of action of the laser beam portions 21 and 22 at least while the laser beam source 11 is active, are shown to connect the mounting member 40 with the mounting member 41. In the depicted exemplary construction of the laser welding arrangement 10, the mounting member 41 carries a rack 44 at its bottom, and a pinion 45 meshing with the rack 44 and driven by a motor 46 effects the displacement of the carrier 39 and of the workpiece assembly 27 mounted thereon relative to the stationary support 14 and thus relative to the laser beam portions 21 and 22 in the longitudinal direction of the interface 30. However, it will be appreciated that, if so desired, the workpiece assembly 27 could be instead stationarily mounted on the support 14, and that it could be the assembly of the laser beam source 11 with the mirror elements 23 and 24 and/or the beam splitter 13 that would be movable relative to the workpiece assembly 27.

It may be seen from the above explanation that the present invention provides a new laser welding technique that utilizes two directly opposed laser beams for accomplishing the laser welding along the interface between the workpieces. The two beams (from a single source or from two separate sources) are directed towards each other from opposing sides of the workpiece assembly. The illustrated horizontal orientation of the interface between the workpieces is preferred, but is not essential for workpieces under an inch in thickness. As mentioned before, the focus location for each beam is situated at the incident surfaces of the workpieces. Sufficient power and focusability in each beam is required to provide a minimum power intensity of approximately $5 \times 10^5$ W/cm$^2$, so that keyhole welding will pertain. Under conditions for which the penetration of a single beam is one half the thickness of the workpieces, the keyholes established by the two beams join at the center of the workpiece assembly, thereby forming a narrow, high depth-to-width ratio weld through the material in a single welding pass.

Figure 3A:
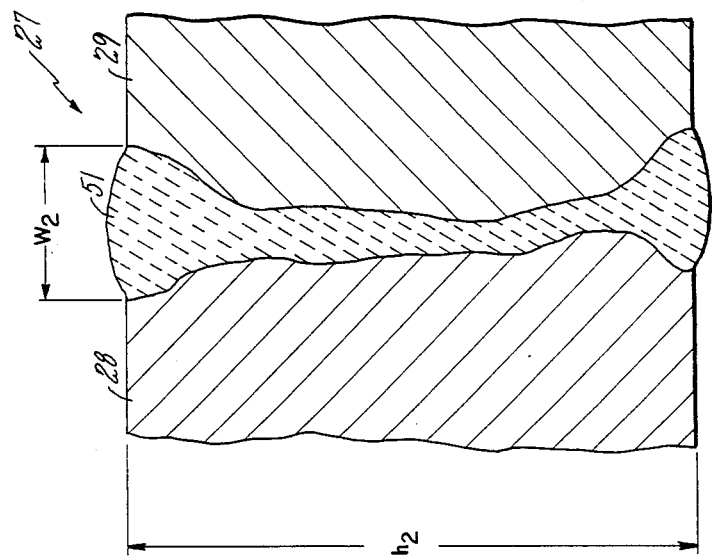
FIGS. 3a and 3b are a view and a photograph similar to those of FIGS. 2a and 2b, respectively, but showing a welded joint obtained when using the approach of the present invention.
Figure 2A:
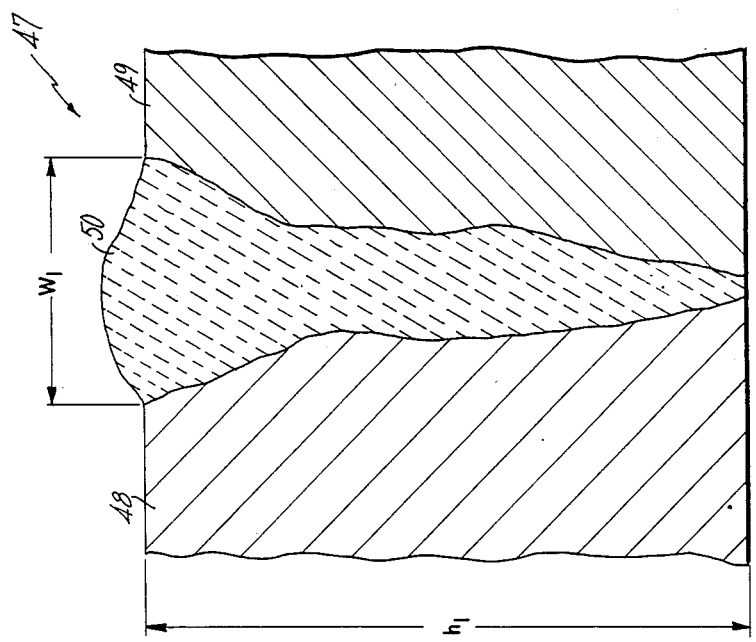
FIGS. 2a and 2b are a cross-sectional view and a photograph, respectively, of a welded joint obtained by laser welding in a single pass and from one side of the workpiece assembly in accordance with a prior art approach.
Figure 3B:
Figure 2B:
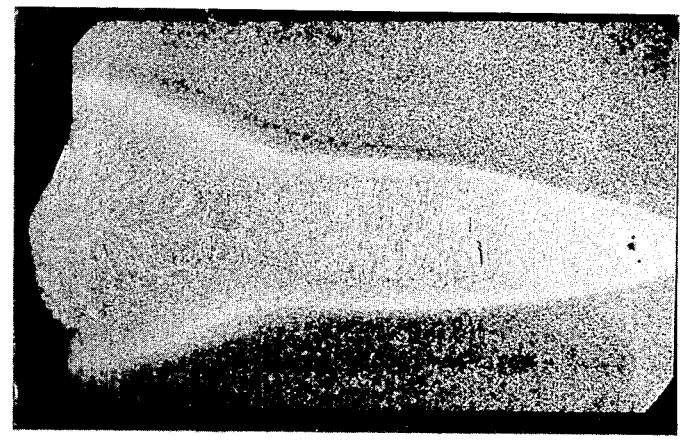

This latter feature of the present invention will now be readily apparent from a comparison of FIGS. 2a and 2b, on the one hand, and FIGS. 3a and 3b of the drawing, on the other hand, with one another. It may be seen in FIG. 2a, which is a representation of a welded region of two workpieces 48 and 49 that has been obtained in accordance with a prior art approach by welding in a single pass from one side of a workpiece assembly 47, and which basically corresponds to the photograph of FIG. 2b, the workpieces 48 and 49 have a thickness $h_1$ of, for instance, 1 inch, and a welded joint 50 which connects the workpieces 48 and 49 has a width $w_1$ which amounts to about one fifth of the $h_1$ dimension, thus obtaining an $h_1:w_1$ ratio of about 5:1.

On the other hand, as shown in FIG. 3a of the drawing which is in the same relationship to FIG. 3b of the drawing as FIG. 2a is to FIG. 2b but which is a representation of a welded region obtained in accordance with the present invention, a welded joint 51 connecting the workpieces 28 and 29 of the workpiece assembly 27 has a width $w_2$ that is substantially smaller in relation to a thickness $h_2$ of the workpieces 28 and 29 than the thickness $w_1$ is with respect to the thickness $h_1$. As a matter of fact, the $h_2:w_2$ ratio is close to 10:1. This is so because, even though the 5:1 ratio still applies to each of the welded zones of the welded joint 51 that is produced from each side of the assembly 27, each of such zones extends substantially only to the depth of $h_2/2$.

This feature brings about a substantial reduction (essentially 50 percent) in the amount of energy expended on the production of the welded joint 51 as compared to that used in making the welded joint 50. Experience has shown that to produce the welded joint 50 of FIGS. 2a and 2b in 1 inch thick material, it is necessary to use about 19 kW of laser beam energy. On the other hand, when producing the welded joint 51 of the present invention as shown in FIGS. 3a and 3b of the drawing, the total amount of laser energy used, which was distributed between the two laser beam portions, amounted to only 10 kW.

It may be seen from the above explanation that the approach to laser welding that is proposed here has a multitude of advantages as compared with the heretofore utilized approaches. So, for instance, the welded joint and the attendant surface beads are relatively narrow, which results, as mentioned above, in a substantial energy saving. On the other hand, it is possible to increase the welding speed for the same material thickness using the same laser beam power, or to increase the thickness of the workpieces being welded together for the same welding speed and laser beam power.

As also already alluded to before, the plasma problems are reduced if not eliminated. This is attributable to the facts that the incident power on a single spot is decreased as compared to a single laser beam welding and that there is a full penetration of the interface region of the workpieces, which results in an enhancement of the venting as compared with the sequential dual-pass welding technique mentioned before. Also, a principal cause of root bead porosity encountered in the sequential dual-pass welding technique, which is the blind penetration, has been eliminated. Furthermore, as compared to the sequential dual-pass technique, the requirement for overpenetration has been eliminated, resulting in an increase in the possible welding speed. The technique proposed by the present invention also results in substantially straight-sided welds, and this results in a reduced thermal distortion of the weldment. The thermal distortion or warping of the workpieces being welded together is further reduced due to the fact that the welding procedure and the attendant thermal loading of the workpieces are symmetrical.

Moreover, the technique of the present invention also results in improved surface bead characteristics as compared to those of a root bead obtained when using the single welding pass approach. This is so because face beads are formed at both sides of the workpiece assembly. Last but not least, the power loss through the weld root when using the single welding pass approach is eliminated as well.

While the present invention has been illustrated and described as embodied in a particular construction of a laser welding arrangement, it will be appreciated that the present invention is not limited to this particular example; rather, the scope of protection of the present invention is to be determined solely from the attached claims.

We claim:

1. A method of laser welding, comprising the steps of:
positioning a plurality of workpieces to be joined next to one another so as to form an assembly having at least one interface between the workpieces;
simultaneously directing two laser beams from opposite sides of the assembly against effective welding regions of the workpieces each of which is situated at the interface on a different one of the sides of the assembly and is substantially aligned with the respective other of said effective welding regions across the assembly as considered from one of the sides of the assembly to the other, each of said laser beams carrying an amount of energy sufficient to form a molten weld pool penetrating into the assembly at the interface to an extent insufficient for either one of the molten weld pools to penetrate to the respective other side of the assembly by itself but sufficient for the two molten weld pools to merge with one another within the assembly; and
effecting relative movement between the assembly and the two laser beams along the interface while maintaining the substantial alignment of the effective welding regions.

2. The method as defined in claim 1, wherein each of the laser beams carries substantially one-half of the total amount of energy so that the molten weld pools merge with one another substantially centrally of the assembly.

3. The method as defined in claim 1, wherein each of the laser beams has a power intensity of at least $5 \times 10^5$ W/cm$^2$ at the effective welding regions.

4. The method as defined in claim 1, wherein said positioning step includes placing the workpieces in such positions that the interface extends substantially horizontally; and wherein said directing step includes aiming the two laser beams substantially horizontally toward the effective welding regions of the workpieces.

5. The method as defined in claim 1, wherein said directing step includes generating a single initial laser beam, splitting the initial laser beam into the two laser beams, and causing each of the two laser beams to propagate along a separate path at least partially situated at the respective side of the assembly toward the respective effective welding regions of the workpieces.

6. The method as defined in claim 1, wherein said directing step includes focusing each of the laser beams onto the respective effective welding regions.

7. The method as defined in claim 1, wherein said directing step includes aiming the two laser beams against one another substantially along a common line that is aligned with the interface.

8. An arrangement for performing laser welding, comprising:
means for holding a plurality of workpieces to be joined next to one another so as to form an assembly having at least one interface between the workpieces;
means for simultaneously directing two laser beams from opposite sides of the assembly against effective welding regions of the workpieces each of which is situated at the interface on a different one of the sides of the assembly and is substantially aligned with the respective other of said effective welding regions across the assembly as considered from one of the sides of the assembly to the other, each of said laser beams carrying an amount of energy sufficient to form a molten weld pool penetrating into the assembly at the interface to an extent insufficient for either one of the molten weld pools to penetrate to the respective other side of the assembly by itself but sufficient for the two molten weld pools to merge with one another within the assembly; and means for effecting relative movement between the assembly and the two laser beams along the interface while maintaining the substantial alignment of the effective welding regions.

9. The arrangement as defined in claim 8, wherein said directing means provides each of the laser beams with substantially one-half of the total amount of energy so that the molten weld pools merge with one another substantially centrally of the assembly.

10. The arrangement as defined in claim 8, wherein each of the laser beams has a power intensity of at least $5 \times 10^5$ W/cm$^2$ at the effective welding regions.

11. The arrangement as defined in claim 8, wherein said holding means is operative for holding the workpieces in such positions that the interface extends substantially horizontally; and wherein said directing means directs the two laser beams substantially horizontally toward the effective welding regions of the workpieces.

12. The arrangement as defined in claim 8, wherein said directing means includes means for generating a single initial laser beam, means for splitting the initial laser beam into the two laser beams each propagating along a separate path at least partially situated at the respective side of the assembly, and means for diverting each of the two laser beams at the respective side of the assembly for propagation toward the respective effective welding regions of the workpieces.

13. The arrangement as defined in claim 12, wherein said diverting means for each of the two laser beams includes at least one concave mirror which focuses the respective one of the two laser beam onto the respective effective welding regions of the workpieces.

14. The arrangement as defined in claim 8, and further comprising means for focusing each of the two laser beams onto the respective effective welding regions of the workpieces.

15. The arrangement as defined in claim 8, wherein said directing means aims the two laser beams against one another substantially along the common line that is aligned with the interface.

* * * * *